United States Patent
Vlachou et al.

(10) Patent No.: US 11,076,307 B2
(45) Date of Patent: Jul. 27, 2021

(54) LTE INTERFERENCE DETECTION AND MITIGATION FOR WI-FI LINKS

(71) Applicant: HEWLETT PACKARD ENTERPRISE DEVELOPMENT LP, Houston, TX (US)

(72) Inventors: Christina Vlachou, Redwood City, CA (US); Swetank Kumar Saha, Williamsville, NY (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 233 days.

(21) Appl. No.: 15/962,722

(22) Filed: Apr. 25, 2018

(65) Prior Publication Data
US 2019/0335347 A1 Oct. 31, 2019

(51) Int. Cl.
*H04W 24/08* (2009.01)
*H04L 12/24* (2006.01)
(Continued)

(52) U.S. Cl.
CPC ......... *H04W 24/08* (2013.01); *H04L 41/0896* (2013.01); *H04W 24/02* (2013.01); *H04W 28/0236* (2013.01)

(58) Field of Classification Search
CPC .............. H04W 72/082; H04W 84/12; H04W 28/0236; H04W 24/02; H04W 24/08; H04L 41/0896
See application file for complete search history.

(56) References Cited

U.S. PATENT DOCUMENTS 7,929,508 B1 4/2011 Yucek et al.
9,264,925 B2 2/2016 Zhao et al.
(Continued)

FOREIGN PATENT DOCUMENTS

CN 101084636 A 12/2007
CN 102388591 A 3/2012
(Continued)

OTHER PUBLICATIONS

Michael Olbrich et al "Towards LTE-U Interference Detection, Assessment and Mitigation in 802.11 Networks usin Commodity Hardware", Feb. 2017.*

(Continued)

*Primary Examiner* — Ricardo H Castaneyra
(74) *Attorney, Agent, or Firm* — McDermott Will & Emery (57) ABSTRACT

A method of adjusting a communication link of a client device of a wireless local area network is described. The method includes monitoring two or more communication links between two or more client devices and a network device in a wireless local area network. The two or more client devices including a first client device and a second client device. The method also includes detecting a degradation in a first communication link between the first client device and the network device. The communication link degradation is not detected in a second communication link between the second client device and the network device. The method further includes determining the degradation in the first communication link is caused at least in part by interference from cellular network communications. The method includes adjusting one or more parameters of the first communication link without affecting the second communication link in response to determining the degradation (Continued)

is cause at least in part by the interference from the cellular network communications.

17 Claims, 6 Drawing Sheets

(51) Int. Cl.
  *H04W 24/02* (2009.01)
  *H04W 28/02* (2009.01)

(56) References Cited

U.S. PATENT DOCUMENTS

| | | | |
|---|---|---|---|
| 9,510,222 | B2 | 11/2016 | Yerramalli et al. |
| 9,532,243 | B2 | 12/2016 | Kim et al. |
| 9,668,263 | B1 | 5/2017 | Tkach et al. |
| 9,736,703 | B2 | 8/2017 | Goldsmith et al. |
| 2006/0014536 | A1 | 1/2006 | Demirhan et al. |
| 2008/0137545 | A1 | 6/2008 | Shiue et al. |
| 2011/0021153 | A1 | 1/2011 | Safavi |
| 2011/0243021 | A1 | 10/2011 | Ponnuswamy |
| 2011/0317647 | A1 | 12/2011 | Cho et al. |
| 2012/0314598 | A1 | 12/2012 | Sadek et al. |
| 2013/0272285 | A1 | 10/2013 | Goldsmith et al. |
| 2014/0064067 | A1 | 3/2014 | Drewes et al. |
| 2015/0056931 | A1 | 2/2015 | Yerramalli et al. |
| 2015/0131536 | A1 | 5/2015 | Kaur et al. |
| 2015/0208253 | A1 | 7/2015 | Kim et al. |
| 2015/0304872 | A1 | 10/2015 | Sadek |
| 2016/0007378 | A1 | 1/2016 | Bertorelle et al. |
| 2016/0174233 | A1 | 6/2016 | Emmanuel et al. |
| 2017/0048838 | A1 | 2/2017 | Chrisikos et al. |
| 2017/0085326 | A1 | 3/2017 | Li et al. |
| 2017/0147940 | A1* | 5/2017 | Mitola, III ............ H04B 17/345 |
| 2017/0164364 | A1 | 6/2017 | Song et al. |
| 2017/0215102 | A1 | 7/2017 | Hassan et al. |
| 2017/0264487 | A1* | 9/2017 | Scahill ................ H04W 52/241 |
| 2017/0272966 | A1 | 9/2017 | Scahill et al. |
| 2017/0273109 | A1 | 9/2017 | Babaei et al. |
| 2018/0212827 | A1 | 7/2018 | Eryigit et al. |

FOREIGN PATENT DOCUMENTS

| | | |
|---|---|---|
| CN | 102687420 A | 9/2012 |
| WO | 2007/055531 A2 | 5/2007 |
| WO | 2014/138645 A1 | 9/2014 |
| WO | 2017/112001 A1 | 6/2017 |

OTHER PUBLICATIONS

Imtiaz Parvez et al "CBRS Spectrum Sharing between LTE-U and Wi Fi: A Multiarmed Bandit Approach", Journal of Mobile Information Systems, vol. 2016, Jan. 1, 2016.*
European Search Report Received for EP Patent Application No. 19170913.8, dated Aug. 30, 2019, 10 pages.
Imtiaz Parvez et al: "CBRS Spectrum Sharing between LTE-U and Wi Fi: A Multiarmed Bandit Approach", Journal of Mobile Information Systems, vol. 2016, Jan. 1, 2016, 13 pages.
Michael Olbrich et al: "Towards LTE-U Interference Detection, Assessment and Mitigation in 882. 11 Networks using Commodity Hardware", Feb. 2017, 13 pages.
Zeng et al., "A first look at 802.11ac in action: Energy efficiency and interference characterization", In 2014 IFIP Networking Conference, Jun. 2014, pp. 1-9.
Yu et al., "Auction-Based Coopetition Between LTE Unlicensed and Wi-Fi", In IEEE Journal on Selected Areas in Communications, vol. 35, pp. 79-90, 2017, 12 pages.
Voicu et al., "Coexistence of Pico- and Femto-cellular LTE-unlicensed with Legacy Indoor Wi-Fi Deployments", IEEE International Conference on Communication Workshop (ICCW), Workshop on LTE in Unlicensed Bands: Potentials and Challenges, 2015, pp. 10041-10047.
T-Mobile Newsroom, "T-Mobile Continues to Boost Capacity for Customers with LTE-U Launching in Spring 2017", (webpage), available online at <https://web.archive.org/web/20170222212601/https://newsroom.t-mobile.com/news-and-blogs/lte-u-launch.htm>, Feb. 22, 2017, 2 pages.
Sur et al., "Practical MU-MIMO User Selection on 802.11Ac Commodity Networks", In ACM MOBICOM'16, 13 pages.
Sheshadri et al., "BLU: Blue-printing Interference for Robust LTE Access in Unlicensed Spectrum", CoNEXT '17, Proceedings of the 13th International Conference on emerging Networking EXperiments and Technologies, Dec. 12-15, 2017, Incheon, Republic of Korea, 13 pages.
Rayanchu et al., "Fluid: improving throughputs in enterprise wireless lans through Flexible channelization", Mobile Computing, IEEE Transactions on, vol. 11, No. 9, 2012, pp. 1455-1469.
Rayanchu et al., "Catching whales and minnows using WiFiNet: deconstructing non-WiFi interference using WiFi hardware", In Proceedings of USENIX NSDI, 2012, 14 pages.
Rayanchu et al., "Airshark: detecting non-WiFi RF devices using commodity WiFi hardware", In Proceedings of ACM Internet Measurement Conference (IMC), 2011, pp. 137-154.
Qualcomm Technologies, Inc.; "LTE in Unlicensed Spectrum"; Jun. 2014; 19 pages.
Pefkianakis et al., "MIMO Rate Adaptation in 802.11N Wireless Networks", In ACM MOBICOM'10, available online at <http://metro.cs.ucla.edu/papers/Pefkianakis.MOBICOM10.pdf>, 10 pages.
Olbrich et al., "WiPLUS: Towards LTE-U Interference Detection, Assessment and Mitigation in 802.11 Networks", In European Wireless 2017 (EW2017), 2017, 8 pages.
Milosevic, N. et al.; "LTE and Wi-Fi Co-existence in 5 GHZ Unlicensed Band"; Sep. 2017; 11 pages.
Martha DeGrasse, "Verizon starts nationwide LAA deployment", (webpage), available online at <https://www.rcrwireless.com/20170804/carriers/verizon-starts-nationwide-laa-deployment-tag4>, Aug. 4, 2017, 5 pages.
Makris et al., "Measuring lte and wifi coexistence in unlicensed spectrum", In 2017 European Conference on Networks and Communications (EuCNC), Jun. 2017, pp. 1-6.
Julius Knapp., "OET Authorizes First LTE-U devices", available online at <https://www.fcc.gov/news-events/blog/2017/02/22/oet-authorizes-first-lte-u-devices>, 2 pages.
Jindal et al., LTE and Wi-Fi in Unlicensed Spectrum: A Coexistence Study, Google whitepaper, 2015, 25 pages.
Jian et al., "Coexistence of Wi-Fi and LAA-LTE: Experimental evaluation, analysis and insights", In IEEE ICCW'15, 8 pages.
IEEE Standards Association, "IEEE Standards 802.11ac-2013: Enhancements for Very High Throughput for Operation in Bands below 6 GHz", 2013, available online at < https://standards.ieee.org/standard/802_11ac-2013.html>, 38 pages.
Guan et al., "CU-LTE: Spectrally-Efficient and Fair Coexistence Between LTE and Wi-Fi in Unlicensed Bands", In IEEE INFOCOM'16, 9 pages.
Giupponi et al., "Simulating LTE and Wi-Fi Coexistence in Unlicensed Spectrum with ns-3", available online at <https://arxiv.org/ftp/arxiv/papers/1604/1604.06826.pdf>, 12 pages.
Frederic Firmin, 3GPP MCC, "The Evolved Packet Core", available online at <https://web.archive.org/web/20170509040250/http://www.3gpp.org/technologies/keywords-acronyms/100-the-evolved-packet-core>, May 9, 2017, 3 pages.
Extended European search report and Search Opinion Received for EP Application No. 18195827.3, dated Feb. 28, 2019, 9 pages.
Dino Flore, "3GPP & unlicensed spectrum", IEEE 802 Interim Session, Atlanta, Jan. 11-16, 2015, 17 pages.
Christina Vlachou et al: "LTERadar", Proceedings of the ACM on Measurement and Analysis of Computing Systems, ACM, 2 Penn Plaza, Suite 701New YorkNY10121-8701USA, vol. 2, No. 2, Jun. 13, 2018 (Jun. 13, 2018), pp. 1-31.
Chai et al., "LTE in unlicensed spectrum: are we there yet?", MobiCom '16 Proceedings of the 22nd Annual International Conference on Mobile Computing and Networking, 2016, pp. 135-148.

(56) References Cited

OTHER PUBLICATIONS

Capretti et al., "LTE/Wi-Fi Co-existence Under Scrutiny: An Empirical Study", Proceedings of the Tenth ACM International Workshop on Wireless Network Testbeds, Experimental Evaluation, and Characterization, 2016, pp. 33-40.

Brenner et al., "Technical response to parties opposed to LTE unlicensed", In Qualcomm TR, 2015, 29 pages.

Anwar et al., "Loss differentiation: Moving onto high-speed wireless LANs", IEEE INFOCOM 2014—IEEE Conference on Computer Communications, 2014, pp. 2463-2471.

André Cavalcante et al., "Performance Evaluation of LTE and Wi-Fi Coexistence in Unlicensed Bands", In IEEE VTC'13, 7 pages.

Ahmed, N. et al., Interference Mitigation in Enterprise WLANS Through Speculative Scheduling, (Research Paper), Proceedings of the 13th Annual ACM International Conference on Mobile Computing and Networking Sep. 9, 2007, pp. 342-345.

Abinader et al., "Enabling the coexistence of lte and wi-fi in unlicensed bands", IEEE Communications Magazine, vol. 52, Issue: 11, Nov. 2014, pp. 54-61.

"Spectrum Analysis" Chapter 34, Aruba Networks, available online at <https://web.archive.org/web/20170916204310/https://www.arubanetworks.com/techdocs/ArubaOS_61/ArubaOS_61_UG/Spectrum_Analysis.php>, Sep. 16, 2017, 46 pages.

"Spectrum Analysis Overview", (webpage), Cisco-Meraki, available online at <https://web.archive.org/web/20160813010042/https://documentation.meraki.com/MR/Radio_Settings/Spectrum_Analysis_Overview>, Aug. 13, 2016, 2 pages.

"OpenEPC", available online at <https://web.archive.org/web/20170925015825/http://openepc.com/>, 2017, 3 pages.

"MulteFire", available online at <https://web.archive.org/web/20170510181640/http://www.multefire.org/>, May 10, 2017, 4 pages.

"LTE-U Forum", available online at <https://web.archive.org/web/20170526112059/http://www.lteuforum.org/>, May 26, 2017, 1 page.

"3GPP Release 13" available online at <https://www.etsi.org/deliver/etsi_en/301800_301899/301893/02.00.07_20/en_301893v020007a.pdf>, accessed Dec. 22, 2017, 123 pages.

Sagari, S.S., Models and Algorithms for Spectrum Coexistence in Wireless Networks, (Research Paper), May 2016, 109 Pgs.

Yun et al., "Supporting WiFi and LTE Co-existence," 2015 IEEE Conference on Computer Communications (INFOCOM), 2015, pp. 810-818.

* cited by examiner

LTE INTERFERENCE DETECTION AND MITIGATION FOR WI-FI LINKS

BACKGROUND

The long-term evolution (LTE) standard, which is used for high-speed wireless communication such as mobile communication, is often deployed in an unlicensed 5 GHz band, which is also commonly used by wireless local area networks. Mobile communication operators deploy LTE in the 5 GHz band to increase a capacity of cellular networks.

Multiple types of LTE protocols, including proprietary protocols, e.g., LTE-unlicensed (LTE-U) and standardized protocols, e.g., licensed assisted access (LAA), offer different coexistence solutions with wireless local area networks (e.g., Wi-Fi) that operate at the 5 GHz.

Despite standardization efforts for coexistence of LTE and local area networks in the 5 GHz, local area networks still experience performance degradation. The performance degradation of local area networks may raise serious concerns in areas with dense mobile communication network deployments.

The description provided in the background section should not be assumed to be prior art merely because it is mentioned in or associated with the background section. The background section may include information that describes one or more aspects of the subject technology.

SUMMARY

According to various aspects of the subject technology, a method of adjusting a communication link of a client device of a wireless local area network is described. The method includes monitoring two or more communication links between two or more client devices and a network device in a wireless local area network. The two or more client devices include a first client device and a second client device. The method includes detecting a degradation in a first communication link between the first client device and the network device and no degradation in a second communication link between the second client device and the network device. The method further includes determining the degradation in the first communication link is caused at least in part by interference from cellular network communications. The method also includes adjusting one or more parameters of the first communication link without affecting the second communication link in response to determining the degradation is cause at least in part by the interference from the cellular network communications.

According to various aspects of the subject technology, a network device of a wireless local area network is described. The network device includes a memory and a processor that executes instructions from the memory. By executing the instructions, the processor monitors two or more communication links between two or more client devices and the network device in a wireless local area network. The two or more client devices include a first client device and a second client device. The processor detects a degradation in a first communication link between the first client device and the network device. The processor also determines the degradation in the first communication link is caused at least in part by an interference from cellular network communications. The processor further determines that there is no degradation in a second communication link between the second client device and the network device caused by the interference from cellular network communications. The processor adjusts one or more parameters of the first communication link without affecting the second communication link in response to determining the degradation is cause at least in part by the interference from the cellular network communications.

According to various aspects of the subject technology, a non-transitory machine-readable storage medium encoded with instructions executable by at least one processor of a network device is described. By executing the instruction, the processor monitors two or more communication links between two or more client devices and the network device in a wireless local area network. The two or more client devices include a first client device and a second client device. The processor detects a degradation in a first communication link between the first client device and the network device. The processor also determines the degradation in the first communication link is caused at least in part by an interference from cellular network communications. The processor further determines communication link degradation in a second communication link between the second client device and the network device is caused by another network device. The processor adjusts one or more parameters of the first communication link without affecting the second communication link in response to determining the degradation is cause at least in part by the interference from the cellular network communications.

According to various aspects of the subject technology, a network device includes means for monitoring communication links between a first client device and the network device and a second client device and the network device in a wireless local area network and detecting a degradation in a first communication link between the first client device and the network device and no degradation in a second communication link between the second client device and the network device. The network device also includes means for determining the degradation in a communication link is caused by interference from mobile communication and adjusting one or more parameters of the communication link having interference from mobile communication such that the adjustment does not affect the other communication link.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In some embodiments, a method is described for mitigating mobile communication interference, e.g., cellular network communication interference, in wireless local area networks that operate at a 5 GHz band. The method may achieve a fair co-existence of mobile communication and wireless local network communication in the 5 GHz band without modifying the mobile communication network. The interferences may be caused by mobile communications at the 5 GHz band using LTE protocols. In some embodiments, performance degradation caused by mobile communication interferences may depend on a physical location of a client device of the wireless local area network. In some embodiments, performance degradation may also depend on a configuration of the mobile communication network. Therefore, performance degradation may occur for a first client device of the wireless local area network but may not occur for a second client device of the same wireless local area network. Performance degradation for the first client device may occur because of a location of the first client device with respect to the configuration of the mobile communication network. In some embodiments, the configuration of the mobile communication network depends on locations and transmission patterns of base stations of the mobile communication network. Thus, the configuration of the mobile communication network may cause strong interference at a location of the first client device but may not cause interference at a location of the second client device. In some embodiments, performance degradation of client devices of a wireless local area network may be monitored on a per client device basis.

In some embodiments, at least two communication links between a network device of a wireless local area network and a first client and a second client device of the wireless local area network are monitored. Monitoring may be performed by the network device of the wireless local area network over the communication links. Monitoring may include observing communication parameters of the first and second communication links between the first and second client devices and the network device. Communication parameters may include a number of excessive retries, a number of short retries, and a number of long retries. The number of short retries may be defined as a number of retries experienced by the network device for short packets, e.g., small packets. The number of long retries may be defined as a number of retries experienced by the network device for regular packets, e.g., long packets. The number of excessive retries may be defined as the number of times a controller of the wireless local area network has failed to send a frame even after multiple re-transmissions. In some examples, a length of a predefined interval of time to observe the excessive retries, the number of short retries, and the number of long retries is also a communication parameter. In some examples, a total number of transmitted packets, e.g., consecutive transmitted packets, to be observed to determine the excessive retries, the number of short retries, and the number of long retries is also a communication parameter.

In some embodiments, the controller of the wireless local area network is included in a network device of the wireless local area network. Thus, statistical data that may include the number of short retries, the number of long retries, and the number of excessive retries may be gathered by the network device via the controller without overhead for the network device. In some aspects, the number of short retries and/or the number of long retries may be presented as fractions over a number of short packets or long packets that are transmitted in a predefined interval of time. In some examples, the number of excessive retries may be presented as a fraction over a number of aggregated single MAC protocol data units (AMPDUs). Thus, the number of excessive retries, the number of short retries, and the number of long retries may be presented as failure rates. In some embodiments, the network device may periodically acquire the statistical data, and based on the statistical data may determine if a communication link to a client device is degraded. The network device may further determine if the communication link to the client device is degraded because of mobile communication.

Figure 1:
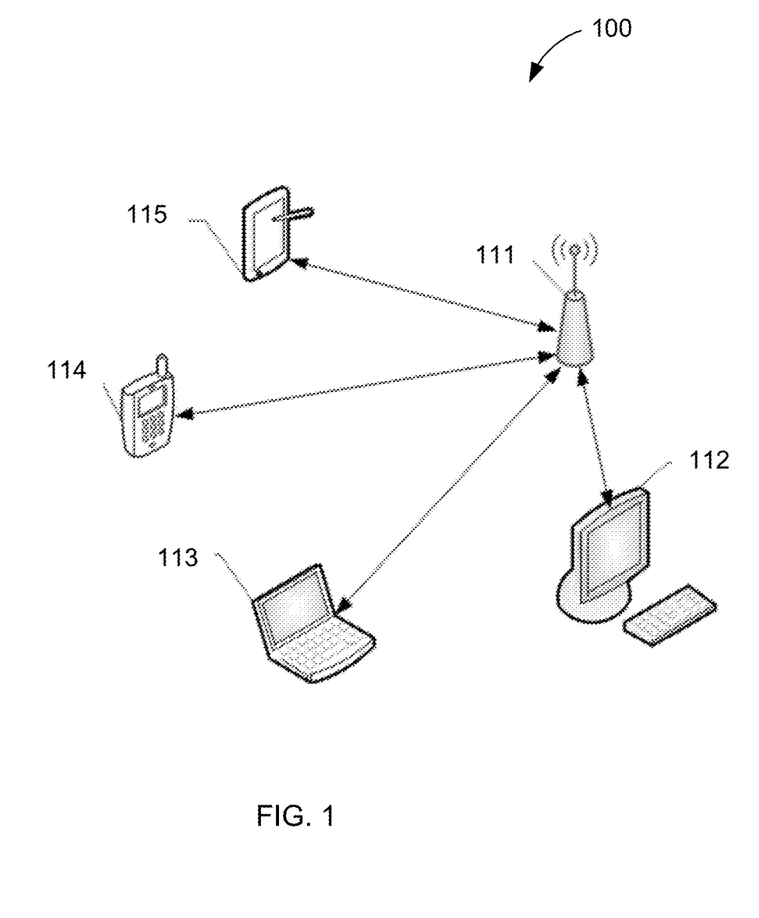
FIG. 1 illustrates a schematic diagram of an exemplary communication system, according to some aspects of the disclosure.

FIG. 1 illustrates a schematic diagram of an exemplary communication system, according to some aspects of the disclosure. The communication system may include a wireless communication network such as wireless communication network 100. Wireless communication network 100 may perform as a wireless local area network (WLAN) and may include a basic service set (BSS) that comprises a plurality of network devices (e.g., WLAN devices). In one aspect, a BSS refers to a set of multiple network devices (e.g., access point) that can communicate in synchronization, rather than a concept indicating a particular area. In the example, wireless communication network 100 includes network device 111 and client devices 112-115.

As used herein, a "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. As used herein, an "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

The network device 111 and/or each one of the client devices 112-115 may include a media access control (MAC) layer and a physical (PHY) layer according to IEEE 802.11 standards. In the example, at least one network device (e.g., network device 111) is an access point (AP).

A network device may be, for example, an AP, a centralized controller (e.g., network controller), a base station (BS), a node-B, a base transceiver system (BTS), a site controller, a network adapter, a network interface card (NIC), a router, or the like. A client device (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability), or the like. In one aspect, an AP is a functional entity for providing access to a distribution system, by way of a wireless medium, for an associated client device. For example, an AP may provide access to the internet for one or more client devices that are wirelessly and communicatively associated with the AP. In FIG. 1, wireless communications between client devices are made by way of an AP. However, when a direct link is established between client devices, the client devices can communicate directly with each other (without using an AP).

Figure 2:
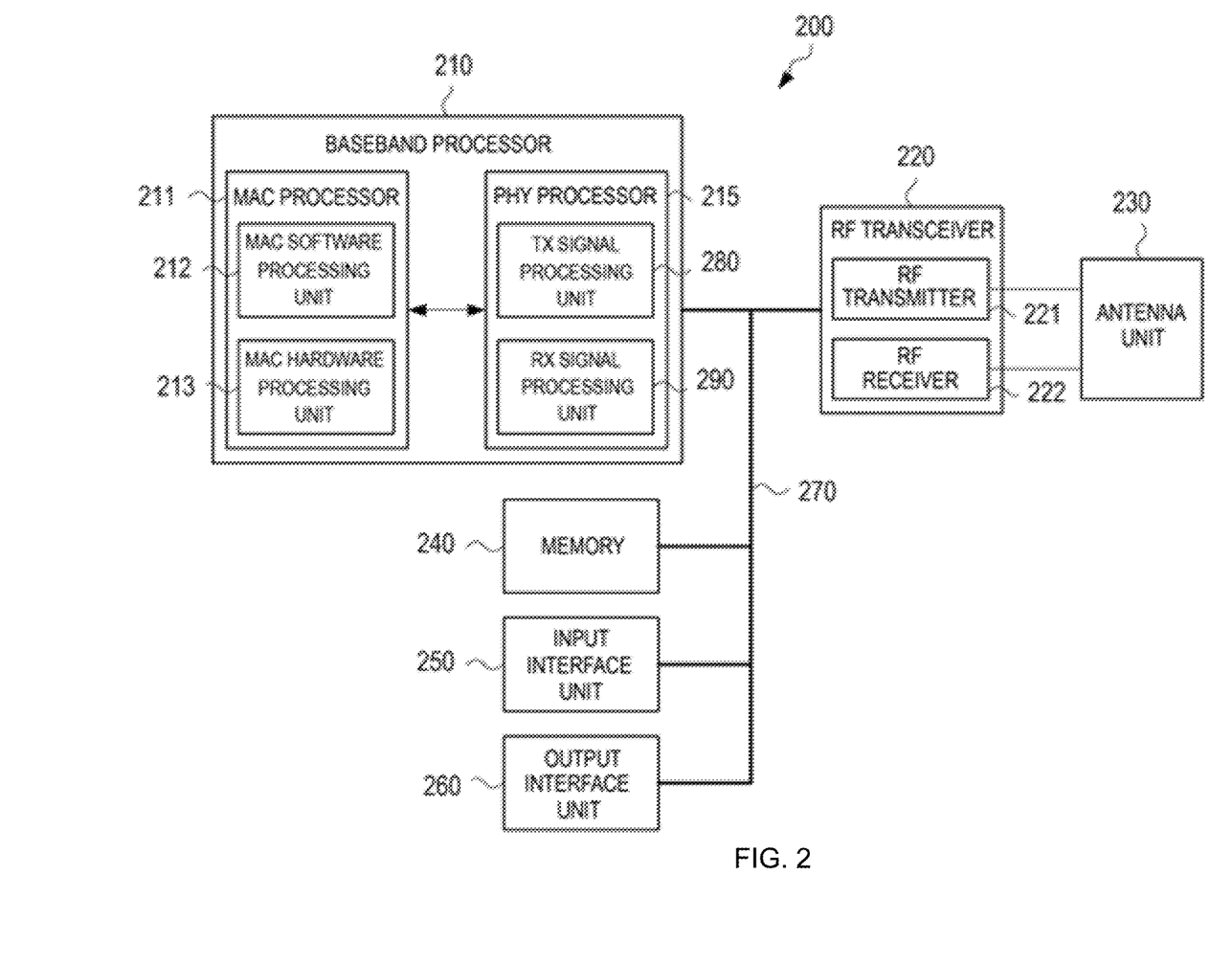
FIG. 2 illustrates a schematic diagram of an exemplary wireless communication device, according to some aspects of the disclosure.

FIG. 2 illustrates a schematic diagram of an exemplary wireless communication device, according to some aspects of the disclosure. The wireless communication device 200 can be a client device, e.g., client devices 112-115, a network device, e.g., network device 111, or a network controller. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the network device 111 and client device 112-115.

In the example, the baseband processor 210 performs baseband signal processing, and includes a medium access control (MAC) processor 211 and a PHY processor 215. The memory 240 may store software (such as MAC software) including at least some functions of a MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter, or the like. The term RX may refer to receiving, receive, received, receiver, or the like.

The PHY processor 215 interfaces to the MAC processor 211 through, among others, transmit vector (TXVECTOR) and receive vector (RXVECTOR) parameters. In some aspects, the MAC processor 211 generates and provides TXVECTOR parameters to the PHY processor 215 to supply per-packet transmit parameters. In some aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215, and/or other components of the wireless communication device 200.

In some embodiments, the wireless communication device 200 includes a permanent storage device (not shown) configured as a read-and-write memory device. The permanent storage device may be a non-volatile memory unit that stores instructions even when the wireless communication device 200 is off. The ROM, registers, and the permanent storage device may be part of the baseband processor 210 or be a part of the memory 240. Each of the ROM, the permanent storage device, and the memory 240 may be an exemplary memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a client device, and the output interface unit 260 outputs information to the client device. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In some embodiments, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different embodiments. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile, and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. Some embodiments may include devices that function as both input and output devices, such as a touchscreen.

Some embodiments can be realized in part or in whole using a computer-readable medium. In one aspect, a computer-readable medium includes one or more media. In some aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In some aspects, a computer is a machine. In some aspects, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the wireless communication device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., wireless communication device 200) to perform operations or a method of the subject disclosure. In some embodiments, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the processors may cause one or more operations of the subject disclosure to occur or cause an apparatus (e.g., wireless communication device 200) to perform operations or a method of the subject disclosure.

In some embodiments, a communication link of a wireless local area network between a client device and a network device at a 5 GHz band may include at least a primary channel. A bandwidth of the primary channel may be defined as either 20 MHz or 40 MHz. In some embodiments, the communication link may include a secondary channel in addition to the primary channel. In some embodiments, the addition of the secondary channel increases the bandwidth of the communication link from 20/40 MHz to 160 MHz. A communication link having both primary and secondary channels may transmit higher data rates compared to communication links having only the primary channel. As described, wireless communication using LTE standard may also use the 5 GHz band. Thus, interference from wireless communication may exist in primary and/or secondary channels of the communication link of the wireless local area networks. In some embodiments, the interference from wireless communication may be present in the secondary channel of communication link of the wireless local area network. Then, in order to mitigate the interference, the network device or a network controller controlling the network device, may determine, e.g., decide, to reduce a bandwidth of the secondary channel of the communication link. In some examples and depending on the interference, the network device falls back to the primary channel and does not use the secondary channel.

In some examples, the interference may exist in the primary channel and thus reducing, e.g., shrinking, or even releasing the secondary channel may not mitigate the interference. In some examples, an inability to mitigate the interference by reducing or even releasing the secondary channel, may be an indication that interference is not originated from the secondary channel. Thus, the interference may exist in the primary channel. Then, the network device or a network controller controlling the network device, may determine to use another primary channel to mitigate the interference from wireless communication. In some examples, the other primary channel is selected in the bandwidth of the released secondary channel.

In some embodiments, the mobile communication and wireless local area network communication may have inherent deafness to each other. Thus, neither of the mobile communication devices nor the wireless local area network devices may decode the other's signals. Thus, energy-based sensing may be used as a mechanism to enable the mobile communication devices and the wireless local area network devices to become aware of each other's presence. Using energy-based sensing, the mobile communication devices may use a listen-before-talk scheme before transmitting a signal. Alternatively, the wireless local area network devices may use clear channel assessment to detect mobile communication.

Figure 3A:
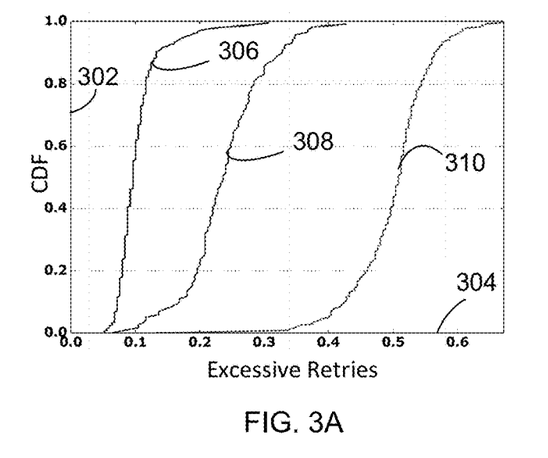
FIG. 3A illustrates graphs of a distribution of a number of excessive retries of an exemplary network device, according to some aspects of the disclosure.
Figure 3B:
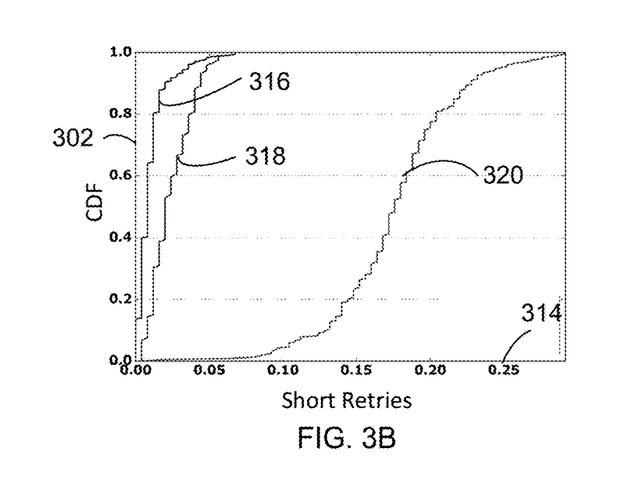
FIG. 3B illustrates graphs of a distribution of a number of retries for small packets of an exemplary network device, according to some aspects of the disclosure.
Figure 3C:
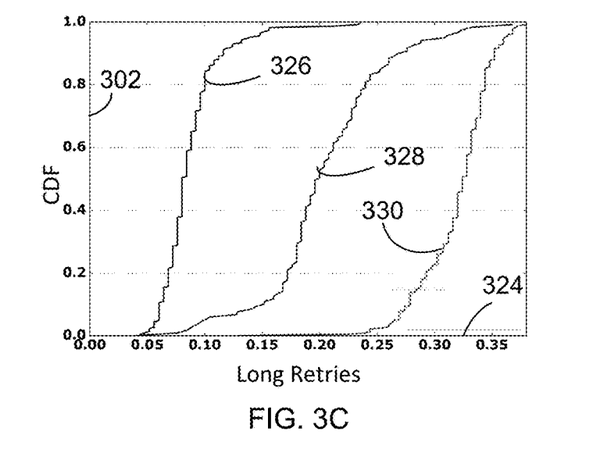
FIG. 3C illustrates graphs of a distribution of a number of retries for large packets of an exemplary network device, according to some aspects of the disclosure.

In some examples, implementing the listen-before-talk scheme by a mobile communication device may rely on a static energy detection threshold of around −72 dBm to detect the wireless local area network communication. In a typical wireless local area network where multiple network devices with possibly different transmission power settings co-exist with a mobile communication network, there may be cases where a listen-before-talk scheme may not detect a presence of wireless local area network communication. In some examples, a clear channel assessment scheme of wireless local area network devices may rely on an energy detection threshold of about −62 dBm to detect mobile communication. In some embodiments, mobile communication with an energy less than −62 dBm may be hidden from wireless local area network devices and thus a wireless local area network device may start transmitting a signal in a presence of the mobile communication. Alternatively, wireless local area network communication with energy less than −72 dBm may be hidden from mobile communication devices and thus a mobile communication device may start transmitting a signal in a presence of wireless local area network communication. FIGS. 3A-3C illustrate graphs acquired by a network device of a wireless local area network such as wireless local area network 100 of FIG. 1.

The graphs correspond to cases that network device 111 of wireless local area network 100 has transmitted signals to one or more client devices 112-115, e.g., client device 114, either because mobile communication did not exist or because mobile communication was not detected.

FIG. 3A illustrates graphs a distribution of number of excessive retries of an exemplary network device, according to some aspects of the disclosure. FIG. 3A shows three graphs 306, 308, and 310 that illustrate the number of excessive retries in a network device such as network device 111 of wireless local area network 100 when communicating with a client device such as client device 114. Graph 306 corresponds to the number of excessive retries when there is no mobile communication in the presence of wireless local area network communication. Graph 308 corresponds to the number of excessive retries when mobile communication is present in the primary channel between network device 111 of wireless local area network 100 and client device 114. Graph 310 corresponds to the number of excessive retries when mobile communication is present in the secondary channel between network device 111 and client device 114.

The number of excessive retries is displayed on coordinate 304 while a cumulative distribution function (CDF) is displayed on coordinate 302. In some examples, cumulative distribution function $F(x)$ is a probability that a random variable takes a value equal or less than x. Data may be acquired by the network device for a predetermined total number of transmitted packets and/or in a predefined interval of time. In some examples, data may be acquired for a total number of 250 AMPDUs. Data may be acquired as a distribution of the frequency of the number of excessive retries such that the data may comprise a first number of zero excessive retries, a second number of one excessive retries, a third number of two excessive retries, etc. Thus, a sum of the frequencies that are the first number, the second number, the third number, etc., may be equal to the total number of AMPDUs. In some examples, coordinate 304 may be normalized by the total number of AMPDUs such that coordinate 304 may show the fraction of total AMPDUs having zero excessive retries, one excessive retries, two excessive retries, etc., excessive retries. In some examples, the acquired frequency of the number of excessive retries may be normalized by the total number of AMPDUs to generate a probability of zero, one, two, etc. In some examples, coordinate 302 may display a CDF of the generated probability.

FIG. 3B illustrates graphs of a distribution of number of short retries of an exemplary network device, according to some aspects of the disclosure. FIG. 3B shows three graphs 316, 318, and 320 that illustrate the number of short retries in a network device such as network device 111 of wireless local area network 100 when communicating with a client device such as client device 114. Graph 316 corresponds to the number of short retries when there is no mobile communication in the presence of wireless local area network communication. Graph 318 corresponds to the number of short retries when mobile communication is present in the primary channel between network device 111 of wireless local area network 100 and client device 114. Graph 320 corresponds to the number of short retries when mobile communication is present in the secondary channel between network device 111 and client device 114.

The number of short retries is displayed on coordinate 314 while a cumulative distribution function (CDF) is displayed on coordinate 302. Data may be acquired by the network device for a predetermined total number of transmitted short packets and/or in a predefined interval of time. In some examples, data may be acquired for a total number of 100-250 AMPDUs. Data may be acquired as a distribution of the frequency of the number of short retries such that the data may comprise a first number of zero short retries, a second number of one short retries, a third number of two short retries, etc. Thus, a sum of the frequencies that are the first number, the second number, the third number, etc., may be equal to the total number of transmitted short packets. In some examples, coordinate 314 may be normalized by the total number of transmitted short packets such that coordinate 314 may show the fraction of a total of short packets having zero short retries, one short retries, two short retries, etc. In some examples, the acquired frequency of the number of short retries may be normalized by the total number of short packets to generate a probability of zero, one, two, etc. short retries. In some examples, coordinate 302 may display a CDF of the generated probability.

FIG. 3C illustrates graphs of a distribution of number of long retries of an exemplary network device, according to some aspects of the disclosure. FIG. 3C shows three graphs 326, 328, and 330 that illustrate the number of long retries in a network device such as network device 111 of wireless local area network 100 when communicating with a client device such as client device 114. Graph 326 corresponds to the number of long retries when there is no mobile communication in the presence of wireless local area network communication. Graph 328 corresponds to the number of long retries when mobile communication is present in the primary channel between network device 111 of wireless local area network 100 and client device 114. Graph 330 corresponds to the number of long retries when mobile communication is present in the secondary channel between network device 111 and client device 114.

The number of long retries is displayed on coordinate 324 while a cumulative distribution function (CDF) is displayed on coordinate 302. Data may be acquired by the network device for a predetermined total number of transmitted long packets and/or in a predefined interval of time. In some examples, data may be acquired for a total number of 250 AMPDUs. Data may be acquired as a distribution of the frequency of the number of long retries such that the data may comprise a first number of zero long retries, a second number of one long retry, a third number of two long retries, etc. Thus, a sum of the frequencies that are the first number, the second number, the third number, etc., may be equal to the total number of transmitted long packets. In some examples, coordinate 324 may be normalized by the total number of transmitted long packets such that coordinate 324 may show a fraction of a total of long packets having zero, one, two, etc., long retries. In some examples, the acquired frequency of the number of long retries may be normalized by the total number of long packets to generate a probability of zero long retries, one long retries, two long retries, etc. In some examples, coordinate 302 may display a CDF of the generated probability.

In some examples, based on graphs of FIGS. 3A-3C, a controller unit of network device 111 may detect a degradation in the communication link between network device 111 and client device 114. The controller unit may detect the degradation based on the distribution of the number of excessive retries, the distribution of the number short retries, and the distribution of the number of long retries, shown in FIGS. 3A-3C, which may be viewed as statistical data. In some examples, based on the statistical data shown in the graphs of FIGS. 3A-3C, a controller unit of network device 111 may detect that there is considerable interference in the secondary channel of the communication link between network device 111 and client device 114. Thus, the controller unit of network device 111 may detect that the degradation is due to interference in the secondary channel. The controller unit of network device 111 may determine to reduce a bandwidth of the secondary channel of the communication link between network device 111 and client device 114. In some examples, based on a location of steepest slope of graphs 308, 318, and 328, it may be concluded that there is moderate interference in the primary channel. In some examples, based on a location of steepest slope of graphs 310, 320, and 330, it may be concluded that there is considerable interference in the secondary channel.

Figure 4A:
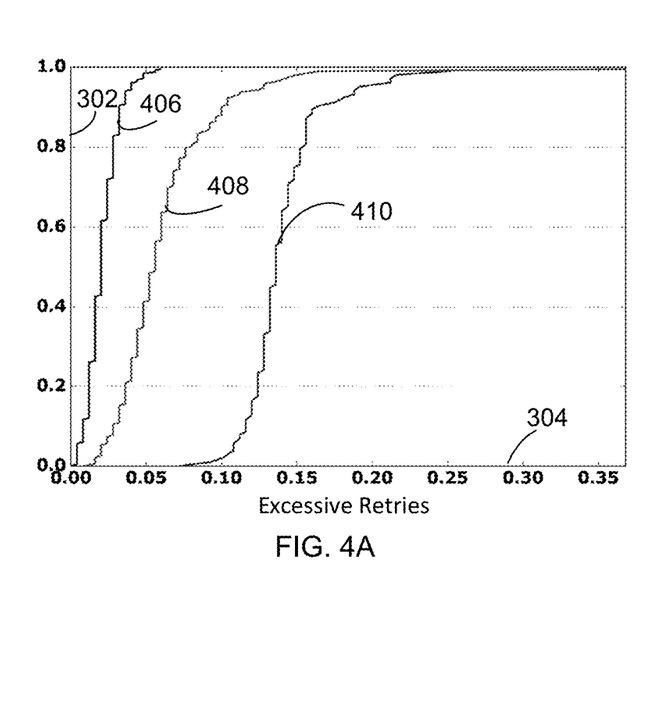
FIG. 4A illustrates graphs of a distribution of a number of excessive retries of an exemplary network device, according to some aspects of the disclosure.

FIG. 4A illustrates graphs of a distribution of number of excessive retries of an exemplary network device, according to some aspects of the disclosure. FIG. 4A shows three graphs 406, 408, and 410 that illustrate the number of excessive retries in a network device such as network device 111 of wireless local area network 100 when communicating with a client device such as client device 112. Graph 406 corresponds to the number of excessive retries when there is no mobile communication in the presence of wireless local area network communication. Graph 408 corresponds to the number of excessive retries when mobile communication is present in the primary channel between network device 111 of wireless local area network 100 and client device 112. Graph 410 corresponds to the number of excessive retries when mobile communication is present in the secondary channel between network device 111 and client device 112. The number of excessive retries is displayed on coordinate 304 while a cumulative distribution function (CDF) is displayed on coordinate 302. Data may be acquired and displayed similar to FIG. 3A.

Figure 4B:
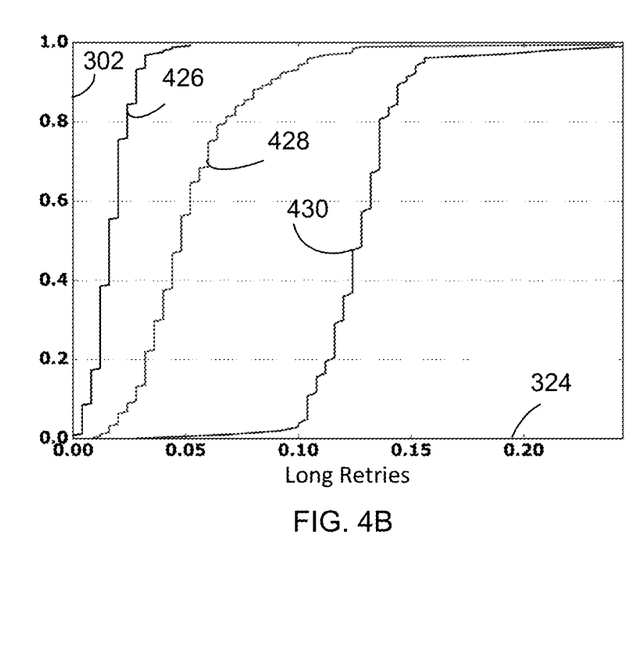
FIG. 4B illustrates graphs of a distribution of a number of long retries of an exemplary network device, according to some aspects of the disclosure.

FIG. 4B illustrates graphs of a distribution of number of long retries of an exemplary network device, according to some aspects of the disclosure. FIG. 4B shows three graphs 426, 428, and 430 that illustrate the number of long retries in a network device such as network device 111 of wireless local area network 100 when communicating with a client device such as client device 112. Graph 426 corresponds to the number of long retries when there is no mobile communication in the presence of wireless local area network communication. Graph 428 corresponds to the number of long retries when mobile communication is present in the primary channel between network device 111 of wireless local area network 100 and client device 112. Graph 430 corresponds to the number of long retries when mobile communication is present in the secondary channel between network device 111 and client device 112. The number of long retries is displayed on coordinate 324 while a cumulative distribution function (CDF) is displayed on coordinate 302. Data may be acquired and displayed similar to FIG. 3C. In some examples, based on a location of steepest slope of graphs 408 and 428, it may be concluded that there is no interference in the primary channel. In some examples, based on a location of steepest slope of graphs 410 and 430, it may be concluded that there is moderate interference in the secondary channel.

Figure 5:
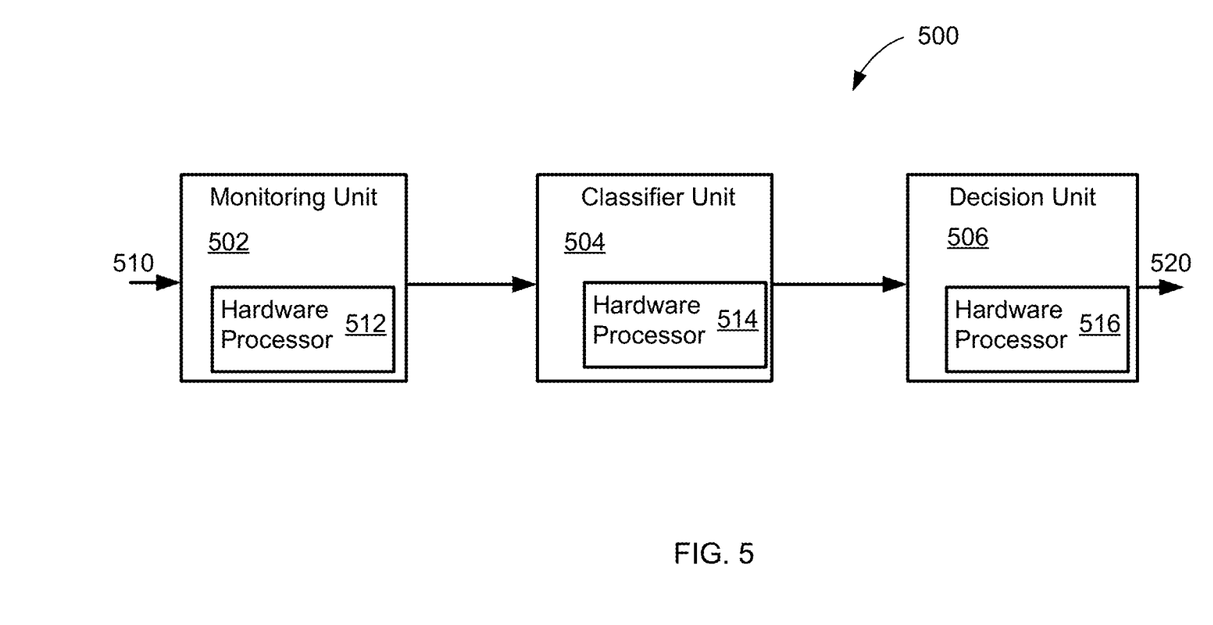
FIG. 5 illustrates a schematic diagram of an exemplary processing system, according to some aspects of the disclosure.

FIG. 5 illustrates a schematic diagram of an exemplary processing system, according to some aspects of the disclosure. Processing system 500 of FIG. 5 may be included in a network device such as network device 111 of FIG. 1 and may comprise monitoring unit 502, classifier unit 504, and decision unit 506. In some embodiments, processing system 500 is included in a controller of network device 111. In some embodiments, monitoring unit 502 includes hardware processor 512 to perform operations performed by monitoring unit 502. In some examples, hardware processor 512 may separately monitor communication links between network device 111 and each one of client devices 112-115. Based on monitoring each communication link, monitoring unit 502 may receive data 510 including a number of excessive retries, a number of short retries, and a number of long retries on a per communication link basis. The number of short retries may be defined as a number of retries experienced by processing system 500 of the network device for short packets, e.g., small packets. The number of long retries may be defined as a number of retries experienced by the processing system 500 for regular packets, e.g., long packets. The number of excessive retries may be defined as the number of times processing system 500 has failed to send a frame even after multiple re-transmissions. As described, the number of excessive retries, the number of short retries, and the number of long retries of each communication link may be normalized by a total number of transmitted packets and may be viewed as statistical data. In some examples, the statistical data is generated in a predefined interval of time and may be updated in successive same predefined intervals of time. In some examples, the statistical data is stored in a memory of network device 111. Examples of the statistical data are shown in FIGS. 3A-3C and 4A-4B.

As described, despite implementing the listen-before-talk scheme by mobile communication devices and despite implementing the clear channel assessment scheme by the wireless local area network devices, mobile communication and wireless local area network communication may interfere. Classifier unit 504 of processing system 500 may include hardware processor 514 to perform operations performed by classifier unit 504. In some examples, hardware processor 514, based on the statistical data, may recognize interference by mobile communication in a communication link of the wireless local area network. In some examples, classifier unit 504 of processing system 500 may recognize interference by mobile communication in the communication link between network device 111 and client device 114. Classifier unit 504 may recognize the interference based on the statistical data as shown in the graphs of FIGS. 3A-3C and may further recognize that the interference is more profound in the secondary channel compared to the primary channel. In addition, in some examples, classifier unit 504 of processing system 500 may recognize interference by mobile communication in the communication link between network device 111 and client device 112. Classifier unit 504 may recognize the interference based on the statistical data as shown in the graphs of FIGS. 4A-4B and may further recognize that moderate interference exists in the secondary channel, but there is no interference in the primary channel.

In some embodiments, decision unit 506 includes hardware processor 516 to perform operations performed by decision unit 506. In some examples, hardware processor 516, based on the recognition of classifier unit 504, may determine an adjustment of the communication link between the network device and the client device. In some embodiments, decision unit 506 may reduce a secondary bandwidth of the communication link between the network device and the client device. In some examples, the classifier unit may recognize, based on the statistical data as shown in the graphs of FIGS. 3A-3C, that mobile communication interference exists in the communication link between client device 114 and network device 111 of FIG. 1. Classifier unit 504 may further recognize that interference is in the secondary channel of the communication link. In some examples, based on the recognition by classifier unit 504, decision unit 506 may reduce the secondary channel of the communication link between client device 114 and network device 111. In some examples, decision unit 506 may reduce the secondary channel of the communication link between client device 114 and network device 111 from 160/80 MHz to 40 MHz. In some examples, decision unit 506 may release the secondary channel of the communication link between client device 114 and network device 111 and may only use the primary channel. In some embodiments, decision unit 506 may send decision command 520 to the network device to adjust the communication link.

In some embodiments and returning to FIG. 1, a degradation in the first communication link between network device 111 and client device 114 may be caused by interference from mobile communication. In addition, a degradation in the second communication link between network device 111 and client device 112 may not be caused by interference from mobile communication. A machine-learning program may be trained based on statistical data that includes distributions of a plurality of excessive retries, a plurality of short retries, and a plurality of long retries in a plurality of predefined intervals of time. The statistical data may be gathered for the first and second communication link as shown in FIGS. 3A-3C and FIGS. 4A-4B. The machine-learning program may be applied on distributions of excessive retries, short retries, and long retries in a predefined interval of time ending in present time to determine that interference in the communication link between network device 111 and client device 114 is caused from mobile communication. In some embodiments, the machine-learning program may determine that the first communication link has degradation because of interference from mobile communication but the second communication link does not have degradation caused by interference of mobile communication. In some examples, the machine-learning program may be implemented by classifier unit 504 of processing system 500.

In some embodiments, the machine learning program includes a neural network comprising an input layer having a first number of nodes equal to a sum of a number of excessive retries data, a number of short retries data, and a number of long retries data. The neural network includes an output layer with one or more nodes and a predetermined number of hidden layers. In some examples, the neural network includes between 3 and 100 hidden layers. In some examples, the neural network may be implemented by classifier unit 504 of processing system 500.

Figure 6:
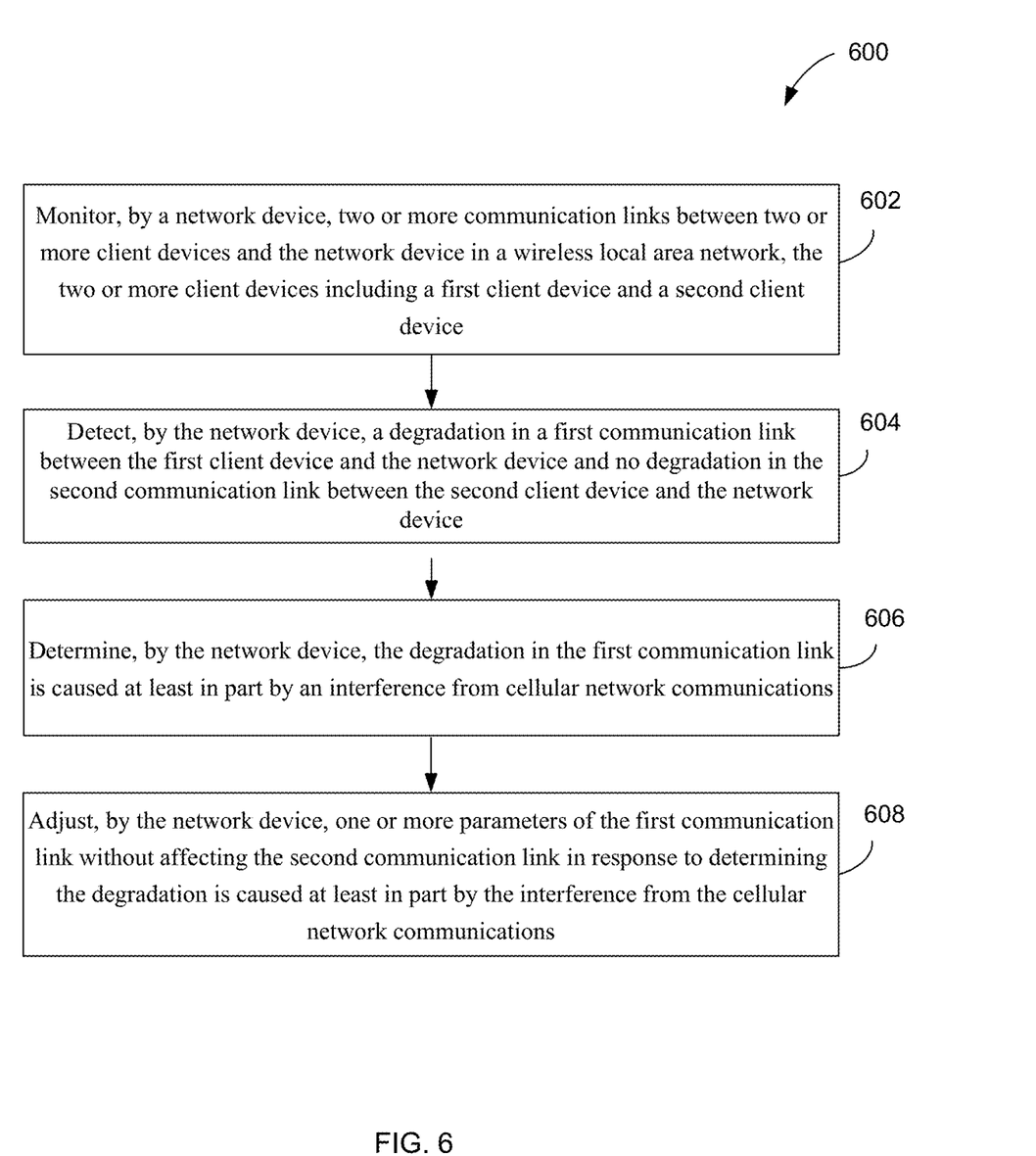
FIG. 6 illustrates a flow diagram of an exemplary process for adjusting a communication link of a client device, according to some aspects of the disclosure.

FIG. 6 illustrates a flow diagram of an exemplary process for adjusting a communication link of a client device, according to some aspects of the disclosure. Notably, one or more steps of process 600 described herein may be omitted, performed in a different sequence, and/or combined with other processes for various types of applications contemplated herein. Process 600 can be performed be a network device of FIGS. 1 and 2 to adjust, e.g., tune, communication links between a client device, e.g., 112, 113, 114, or 115 and network device 111 of the communication system of FIG. 1.

The process 600 begins at step 602, where communication links between two or more client devices and a network device in a wireless local area network are monitored. The client devices may include a first client device and a second client device. Monitoring may be performed by monitoring unit 502 of processing system 500 of FIG. 5. As described with respect to FIG. 5, each communication link may separately be monitored. Thus, a first communication link between a first client device, e.g., client device 114, and network device 111 may be monitored. In addition, a second communication link between a second client device, e.g. client device 112, and network device 111 may be monitored. Based on the monitoring, monitoring unit 502 may receive a number of excessive retries, a number of short retries, and a number of long retries for each communication link from the network device.

In step 604, a degradation in a first communication link between the first client device and the network device is detected. No degradation is detected in the second communication link between the second client device and the network device. In some examples, classifier unit 504 of processing system 500 of FIG. 5 may recognize the degradation, based on the statistical data as shown in the graphs of FIGS. 3A-3C, in the communication link between client device 114 and network device 111. In some examples, classifier unit 504 of processing system 500 may recognize, based on the statistical data as shown in the graphs of FIGS. 4A-4B that there is no degradation in the communication link between client device 112 and network device 111. In some examples, no communication link degradation from mobile communication is determined. Absence of communication link degradation may be determined when an average of excessive retries, an average number of short retries, and an average number of long retries stay below 0.10. In some examples, communication link degradation from mobile communication is determined when at least one of the average of excessive retries, the average number of short retries, and the average number of long retries are above 0.30. The averages may be determined based on the statistical data as shown in graphs of FIGS. 3A-3C or FIGS. 4A-4B.

In step 606, it is determined that the degradation in the first communication link is caused at least in part by an interference from mobile communication. As described, classifier unit 504 may recognize, based on the statistical data as shown in graphs of FIGS. 3A-3C, that mobile communication interference exists in the communication link between client device 114 and network device 111 of FIG. 1. In addition, classifier unit 504 may further recognize that interference has caused a communication link degradation.

In step 608, one or more parameters of the first communication link is adjusted without affecting the second communication link. The adjustment is performed in response to determining that the degradation is caused at least in part by the interference from the cellular network communications. In some examples, classifier unit 504 may recognize, based on the statistical data as shown in the graphs of FIGS. 3A-3C, that mobile communication degradation is due to interference in the secondary channel of the communication link. Thus, decision unit 506 may send decision command 520 to the network device to adjust the communication link by reducing a bandwidth of the secondary channel. In some examples, decision unit 506 may send decision command 520 to the network device to release the secondary channel. In some examples, it may be determined that interference in the primary channel is more profound that interference in the secondary channel. Thus, the network device may change the primary channel. In some examples, the communication link is adjusted by modifying a modulation and coding scheme corresponding to a physical layer. In some examples, the communication link is adjusted by modifying a number of spatial streams of the network device to change an antenna pattern.

In some embodiments, the communication system of FIG. 1 may include one or more wireless local area networks in addition to wireless local area network 100. A network controller of the communication system may communicate to the network devices of the wireless local area networks and may control the network devices. In some examples, the statistical data may be transmitted by the network devices to the network controller to be stored at the network controller. In some examples, the network controller may determine, based on the statistical data, if a communication link between a client device of a network device and the same network device is degraded because of interference from mobile communication. In some examples, the network controller may determine, based on the statistical data, that the communication link, although degraded, is not degraded because of interference from mobile communication. In some examples, the network controller may determine, based on the statistical data, that the communication link is degraded because of the other wireless local area networks.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations, or processes disclosed is an illustration of exemplary approaches. Based upon design preferences, it is understood that the specific order or hierarchy of steps, operations, or processes may be rearranged. Some of the steps, operations, or processes may be performed simultaneously. Some or all of the steps, operations, or processes may be performed automatically, without the intervention of a user. The accompanying method claims, if any, present elements of the various steps, operations, or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "module for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

What is claimed is:

1. A method comprising:
monitoring, by a network device, two or more communication links between two or more client devices and the network device in a wireless local area network, the two or more client devices including a first client device and a second client device;
detecting, by the network device, a degradation in a first communication link between the first client device and the network device and no degradation in a second communication link between the second client device and the network device;
determining, by the network device, the degradation in the first communication link is caused at least in part by an interference from cellular network communications,
wherein determining the degradation in the first communication link is caused by the interference from cellular network communications is based on one or more of a first distribution of excessive retries, a second distribution of short retries, and a third distribution of long retries, and wherein determining that the degradation in the first communication link is caused by the interference from cellular network communications further includes:
training a machine learning program based on a first plurality of statistical data of the first communication link acquired in a second plurality of predefined intervals of time, wherein each statistical data includes the first distribution of excessive retries, the second distribution of short retries, and the third distribution of long retries, acquired in each of the second plurality of predefined intervals of time, wherein the machine learning program includes a neural network having an input layer, the input layer having a first number of nodes equal to a sum of a number of excessive retries, a number of short retries, and a number of long retries, wherein the neural network includes an output layer with one or more nodes, and wherein the neural network includes a predetermined number of hidden layers; and applying the first distribution of excessive retries, the second distribution of short retries, and the third distribution of long retries, acquired in a predefined interval of time different from the second plurality of predefined intervals of time to the trained machine-learning program to determine an interference in the predefined interval of time is caused by cellular network communications; and adjusting, by the network device, one or more parameters of the first communication link without affecting the second communication link in response to determining the degradation is caused at least in part by the interference from the cellular network communications.

2. The method of claim 1, wherein the adjustment includes reducing a bandwidth of the first communication link.

3. The method of claim 1, wherein the first communication link comprises a primary channel and a secondary channel, and wherein the method further comprises:
reducing, by the network device, a bandwidth of the secondary channel.

4. The method of claim 3, wherein reducing the bandwidth of the secondary channel includes releasing the secondary channel.

5. The method of claim 1, wherein detecting the degradation is based on one or more of a first distribution of excessive retries, a second distribution of short retries, and a third distribution of long retries in a predefined interval of time or for a predetermined number of transmitted packets.

6. A network device, comprising:
a memory; and
a processor executing instructions from the memory to:
monitor two or more communication links between two or more client devices and the network device in a wireless local area network, the two or more client devices including a first client device and a second client device;
detect a degradation in a first communication link between the first client device and the network device;
determine the degradation in the first communication link is caused at least in part by an interference from cellular network communications,
wherein determining the degradation in the first communication link is caused by the interference from cellular network communications is based on one or more of a first distribution of excessive retries, a second distribution of short retries, and a third distribution of long retries, and wherein determining that the degradation in the first communication link is caused by the interference from cellular network communications further includes:
train a machine learning program based on a first plurality of statistical data of the first communication link acquired in a second plurality of predefined intervals of time, wherein each statistical data includes the first distribution of excessive retries, the second distribution of short retries, and the third distribution of long retries, acquired in each of the second plurality of predefined intervals of time, wherein the machine learning program includes a neural network having an input layer, the input layer having a first number of nodes equal to a sum of a number of excessive retries, a number of short retries, and a number of long retries, wherein the neural network includes an output layer with one or more nodes, and wherein the neural network includes a predetermined number of hidden layers; and apply the first distribution of excessive retries, the second distribution of short retries, and the third distribution of long retries, acquired in a predefined interval of time different from the second plurality of predefined intervals of time to the trained machine-learning program to determine an interference in the predefined interval of time is caused by cellular network communications;

determine no degradation in a second communication link between the second client device and the network device caused by interference from the cellular network communications; and adjust one or more parameters of the first communication link without affecting the second communication link in response to determining the degradation is caused at least in part by the interference from the cellular network communications.

7. The network device of claim 6, wherein the adjustment includes reducing a bandwidth of the first communication link, wherein by reducing the bandwidth, a modification to a modulation and coding scheme or a modification to a number of spatial streams is avoided.

8. The network device of claim 6, wherein the first communication link comprises a primary channel and a secondary channel, and wherein the processor executes instructions to:
reduce a bandwidth of the secondary channel.

9. The network device of claim 8, wherein reducing the bandwidth of the secondary channel includes releasing the secondary channel.

10. The network device of claim 6, wherein to detect the degradation is further based on one or more of excessive retries, short retries, and long retries in a predefined interval of time or for a predetermined number of transmitted packets.

11. The network device of claim 6, wherein to determine the degradation in the first communication link is caused by the interference from cellular network communications is further based on one or more of excessive retries, short retries, and long retries.

12. A non-transitory machine-readable storage medium encoded with instructions executable by at least one processor of a network device, the machine-readable storage medium comprising instructions to:
monitor two or more communication links between two or more client devices and the network device in a wireless local area network, the two or more client devices including a first client device and a second client device;
detect a degradation in a first communication link between the first client device and the network device;
determine the degradation in the first communication link is caused at least in part by an interference from cellular network communications, wherein determining the degradation in the first communication link is caused by the interference from cellular network communications is based on one or more of a first distribution of excessive retries, a second distribution of short retries, and a third distribution of long retries, and wherein determining that the degradation in the first communication link is caused by the interference from cellular network communications further includes:

training a machine learning program based on a first plurality of statistical data of the first communication link acquired in a second plurality of predefined intervals of time, wherein each statistical data includes the first distribution of excessive retries, the second distribution of short retries, and the third distribution of long retries, acquired in each of the second plurality of predefined intervals of time, wherein the machine learning program includes a neural network having an input layer, the input layer having a first number of nodes equal to a sum of a number of excessive retries, a number of short retries, and a number of long retries, wherein the neural network includes an output layer with one or more nodes, and wherein the neural network includes a predetermined number of hidden layers; and applying the first distribution of excessive retries, the second distribution of short retries, and the third distribution of long retries, acquired in a predefined interval of time different from the second plurality of predefined intervals of time to the trained machine-learning pro-ram to determine an interference in the predefined interval of time is caused by cellular network communications;

determine a degradation in a second communication link between the second client device and the network device is caused by another network device; and adjust one or more parameters of the first communication link without affecting the second communication link in response to determining the degradation is caused at least in part by the interference from the cellular network communications.

13. The non-transitory machine-readable storage medium of claim 12, wherein the adjustment includes reducing a bandwidth of the first communication link.

14. The non-transitory machine-readable storage medium of claim 12, wherein the first communication link comprises a primary channel and a secondary channel, and wherein the processor further executes instructions to:

reduce a bandwidth of the secondary channel.

15. The non-transitory machine-readable storage medium of claim 14, wherein to reduce the bandwidth of the secondary channel includes to release the secondary channel.

16. The non-transitory machine-readable storage medium of claim 12, wherein to detect the degradation is further based on one or more of excessive retries, short retries, and long retries in a predefined interval of time or for a predetermined number of transmitted packets.

17. The non-transitory machine-readable storage medium of claim 12, wherein to determine the degradation in the first communication link is caused by interference from cellular network communications is further based on one or more of excessive retries, short retries, and long retries.

* * * * *